United States Patent
Guethe et al.

(10) Patent No.: US 9,429,079 B2
(45) Date of Patent: Aug. 30, 2016

(54) METHOD AND APPARATUS FOR DETECTING COMBUSTION CONDITIONS IN COMBUSTORS OF A SEQUENTIAL COMBUSTION GAS TURBINE ENGINE

(71) Applicant: ALSTOM Technology Ltd., Baden (CH)

(72) Inventors: Felix Guethe, Basel (CH); Dragan Stankovic, Nussbaumen (CH); Meike Gumprecht-Liebau, Baden-Ruetihof (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 957 days.

(21) Appl. No.: 13/647,566

(22) Filed: Oct. 9, 2012

(65) Prior Publication Data
US 2013/0098054 A1    Apr. 25, 2013

(30) Foreign Application Priority Data

Oct. 14, 2011 (CH) ..................... 1676/11

(51) Int. Cl.
*F02C 9/26* (2006.01)
*F23N 5/00* (2006.01)
(Continued)

(52) U.S. Cl.
CPC ............. *F02C 9/263* (2013.01); *F02C 3/34* (2013.01); *F02C 9/28* (2013.01); *F23C 9/00* (2013.01); *F23N 1/082* (2013.01); *F23N 5/006* (2013.01);
(Continued)

(58) Field of Classification Search
CPC .. F23R 2900/03341; F02C 3/34; F02C 9/263; F02C 9/28; F23C 9/00; F23N 2021/12; F23N 5/003; F23N 5/006; F23N 2900/05001; F23N 2900/05002; F23N 2900/05003; F05D 2270/0831; Y02E 20/328
See application file for complete search history.

(56) References Cited

U.S. PATENT DOCUMENTS

| | | | |
|---|---|---|---|
| 5,024,055 A | 6/1991 | Sato et al. |
| 7,503,178 B2 | 3/2009 | Buecker et al. |

(Continued)

FOREIGN PATENT DOCUMENTS

| | | |
|---|---|---|
| CN | 101309857 A | 11/2008 |
| EP | 0478481 | 4/1992 |

(Continued)

OTHER PUBLICATIONS

Search Report for Swiss Patent App. No. 1676/2011 (Jan. 20, 2012).
(Continued)

*Primary Examiner* — William H Rodriguez
(74) *Attorney, Agent, or Firm* — Buchanan Ingersoll & Rooney PC

(57) ABSTRACT

In a method for operating a gas turbine (10), a CO2-containing gas is compressed in a compressor (13), the compressed gas is used to burn a fuel in at least one subsequent combustion chamber (14, 18), and the hot combustion gases are used to drive at least one turbine (17, 21). Improved control and performance can be achieved by measuring the species concentration of the gas mixture flowing through the gas turbine (10) at several points within the gas turbine (10) by a distributed plurality of species concentration sensors (22; 22a-1; 23), and utilizing the measured concentration values to control the gas turbine (10) and/or optimize the combustion performance of the gas turbine (10).

19 Claims, 1 Drawing Sheet

(51) Int. Cl.
*F02C 3/34* (2006.01)
*F02C 9/28* (2006.01)
*F23N 1/08* (2006.01)
*F23C 9/00* (2006.01)

(52) U.S. Cl.
CPC ....... *F05D 2270/08* (2013.01); *F23C 2202/50* (2013.01); *F23N 2021/12* (2013.01); *F23N 2041/20* (2013.01); *Y02E 20/328* (2013.01)

(56) References Cited

U.S. PATENT DOCUMENTS

| | | | |
|---|---|---|---|
| 7,526,914 B2 * | 5/2009 | Nakano | 60/276 |
| 7,694,523 B2 * | 4/2010 | Carin | F26B 23/001 34/446 |
| 8,103,429 B2 * | 1/2012 | Sivasubramaniam et al. | 701/109 |
| 8,539,749 B1 * | 9/2013 | Wichmann et al. | 60/39.52 |
| 2004/0055273 A1 * | 3/2004 | Hirayama et al. | 60/39.281 |
| 2004/0107701 A1 * | 6/2004 | Miyake | F23N 1/022 60/772 |
| 2006/0053802 A1 * | 3/2006 | Sasao et al. | 60/772 |
| 2008/0147295 A1 * | 6/2008 | Sivasubramaniam | F02D 41/0235 701/103 |
| 2009/0165377 A1 | 7/2009 | Koh et al. | |
| 2010/0115960 A1 | 5/2010 | Brautsch et al. | |
| 2013/0014514 A1 * | 1/2013 | Romig et al. | 60/776 |
| 2013/0269362 A1 * | 10/2013 | Wichmann et al. | 60/773 |
| 2014/0182299 A1 * | 7/2014 | Woodall et al. | 60/774 |
| 2015/0000296 A1 * | 1/2015 | Guethe et al. | 60/772 |
| 2015/0345791 A1 * | 12/2015 | Whiteman | F02C 9/34 60/776 |

FOREIGN PATENT DOCUMENTS

| | | |
|---|---|---|
| EP | 1531243 | 5/2005 |
| EP | 2107305 | 10/2009 |
| EP | 2287456 | 2/2011 |
| WO | WO2010044958 | 4/2010 |

OTHER PUBLICATIONS

Office Action issued on Feb. 11, 2015, by the State Intellectual Property Office, P.R. China in corresponding Chinese Patent Application No. 201210461815.0. (8 Pages).

* cited by examiner

METHOD AND APPARATUS FOR DETECTING COMBUSTION CONDITIONS IN COMBUSTORS OF A SEQUENTIAL COMBUSTION GAS TURBINE ENGINE

This application claims priority under 35 U.S.C. §119 to Swiss App. No. 01676/11, filed 14 Oct. 2011, the entirety of which is incorporated by reference herein.

BACKGROUND

1. Field of Endeavor

The present invention relates to the technology of gas turbines, to methods for operating a gas turbine, and to gas turbines useful for carrying out said methods.

2. Brief Description of the Related Art

When flue gas recirculation (FGR) is used in a gas turbine, i.e., a part of the flue gas at the exit of the gas turbine is recirculated back to the entrance and mixed with fresh gas (air), the O2 content is reduced, thereby limiting the operation due to incomplete combustion and resulting in high CO emissions.

Furthermore in the combustor of the gas turbine specific parts might be affected by rich and O2-depleted parts of the gas stream. Identifying this region and operating regimes is useful in operating the gas turbine in a safe mode ensuring long lifetime.

The control of the FGR ratio is a demanding task for the operation. For operating the engine, a measure of FGR ratio is needed. If not on mass flow directly, this could be done via the O2 content at the entrance of the compressor.

The use of O2 sensors for flame supervision has already been disclosed in the prior art (see document EP 2 107 305). The measurement of O2 concentrations in this document is limited to the determination of the flame temperatures ($T_{flame}$). Not mentioned is the application for FGR to prevent combustion regimes of rich stoichiometry.

It would be of great value to implement a fast, low cost and reliable sensor for measurement of the species concentration (particularly O2) at several points in the gas turbine and use these measurements for gas turbine control and/or optimization of the combustion performance.

With additional sensors the gas turbine would be enabled to approach the limits of operation.

For the combustor, the use of ZrO2 sensors could also be used locally to avoid lifetime reduction due to reducing atmospheres and to homogenize flames. Such ZrO2 sensors would be used similar to 3-way catalysts in cars for optimization of operation.

SUMMARY

One of numerous aspects of the present invention includes a method for operating a gas turbine, which enables improved gas turbine control and performance.

Another aspect includes a method for operating a gas turbine, wherein a CO2-containing gas is compressed in a compressor, the compressed gas is used to burn a fuel in at least one subsequent combustion chamber, and the hot combustion gases are used to drive at least one turbine, characterized in that the species concentration of the gas mixture flowing through the gas turbine is measured at several points within the gas turbine by a plurality of species concentration sensors provided in a distributed arrangement, and the measured concentration values are utilized to control the gas turbine and/or optimize the combustion performance of said gas turbine.

According to an embodiment, at least the O2 concentration is measured by said plurality of species concentration sensors.

According to another embodiment, ZrO2 sensors are used as said species concentration sensors.

Yet another embodiment is characterized in that the gas turbine is of the sequential-combustion-type with two combustors and two turbines respectively and flue gas recirculation, whereby at least part of the flue gas at the exit of the gas turbine is recirculated and enters the compressor after being mixed with fresh gas, the species concentrations of O2 and preferably other species, especially CO2, CO, NOx and H2O, are measured, and the fuel flow into the second combustor is controlled based on the measured species concentrations.

Preferably, the O2 profile is measured after the first turbine near the place where the first turbine outlet temperature is measured, to identify rich and lean zones in the first combustor.

Especially, the species measurement is done at atmospheric pressure with fresh air as a reference.

According to another embodiment, the O2 profile is measured inside the first combustor.

Especially, the measurements are used to extract local values of the flame temperature.

Yet another aspect includes a gas turbine which comprises a compressor, a first combustor with a first combustion chamber and first burners, a first turbine downstream of said first combustor, a second combustor with a second combustion chamber and second burners downstream of said first turbine, a second turbine downstream of said second combustor, and means for recirculating part of the flue gas from the exit of the gas turbine to its entrance. It is characterized in that a plurality of species concentration sensors is arranged within the gas flow of the gas turbine, and the species concentration sensors are connected to a control unit, which controls the operation of the gas turbine.

According to another embodiment of the gas turbine, fuel supply valves are provided at a fuel supply of the second burners, and said fuel supply valves are operated by said control unit in accordance with the measurements of said species concentration sensors.

Preferably, said species concentration sensors are arranged at distributed circumferential positions with respect to the axis of the gas turbine, and after the first turbine near the place, where the first turbine outlet temperature is measured.

Alternatively, said species concentration sensors are arranged at distributed circumferential positions with respect to the axis of the gas turbine, and inside the first combustor.

Especially, said species concentration sensors are ZrO2 sensors.

BRIEF DESCRIPTION OF THE DRAWINGS

The present invention is now to be explained more closely by different embodiments and with reference to the attached drawings.

DETAILED DESCRIPTION OF EXEMPLARY EMBODIMENTS

In general, there are several possibilities of utilizing ZrO2 sensors for fast O2 measurements in a gas turbine.

Figure 1:
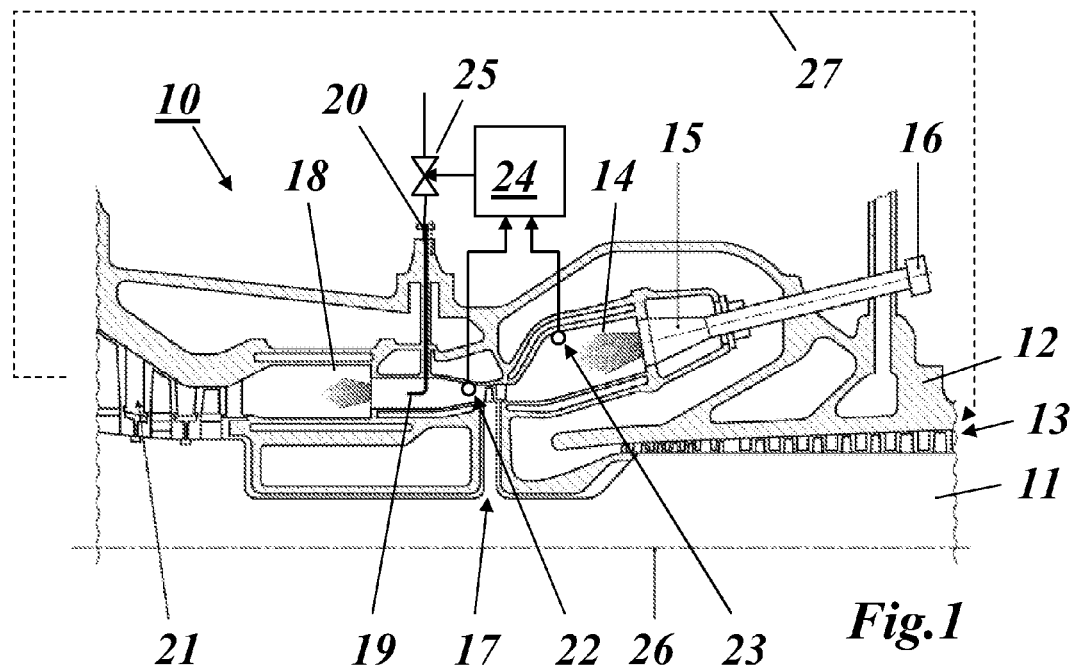
FIG. 1 shows a longitudinal cross section of a gas turbine with sequential combustion and flue gas recirculation according to an embodiment of the invention.

The present disclosure is directed to achieving homogeneity of the gas stream at the exit of the combustor in a gas turbine with sequential combustion and flue gas recirculation. The simplified scheme of such a gas turbine is shown in FIG. 1: The gas turbine 10 of FIG. 1 includes a rotor 11 with an axis 26 being surrounded by an inner casing 12. A compressor 13 compresses the incoming working gas. The compressed gas enters a first combustor 14, 15 with a first combustion chamber 14 and first burners 15, which receive their fuel at a fuel input 16. The hot combustion gases of the first combustor 14, 15 flow through a first turbine 17 and enter a second combustor 18, 19 with the second combustion chamber 18 and second burners 19, which receive their fuel and a fuel input 20. The hot combustion gases of the second combustor 18, 19 flow through a second turbine 21 to leave the gas turbine 10 as flue gas. Part of the flue gas is recirculated by a recirculating device 27 (dashed line) to the entrance of the compressor 13 to be mixed there with fresh gas or air.

The species concentrations of, for example, CO2, CO, NOx and especially the O2 content in the combustor exit plane of the first combustor 14, 15, will probably exhibit some (off design) distribution when measured with fast ZrO2 probes (or any other fast sensor) due to an inhomogeneous distribution of fuel in the first and second combustors 14, 15 and 18, 19, asymmetric cooling air flows, and perhaps an asymmetric O2 pattern at the inflow after mixing recirculated and fresh gas.

This leads to inhomogeneous distribution of O2 and fuel and, therefore, leads to high CO emissions for the engine, thereby limiting the engine operation range. To mitigate this, the fuel flow of the second combustor 18, 19 shall—according to principles of the present invention—be controlled based on either of the two following measurements:

(1) The measurement of the O2 profile after the first turbine 17 (with species concentration sensors 22 or 22a-1 of FIG. 2) near the turbine outlet temperature 1 (TAT1) enables identifying rich and lean zones in the combustor 14, 15. Near the limit, the O2 concentrations to be measured will be between 2 and 6%, where 2-3% O2 are added by the turbine cooling. This measurement requires several probes and a medium accuracy, since the expected signal is not as sensitive as near the stoichiometry inside the combustor. However the measurement at atmospheric pressure with fresh air as a reference will be unproblematic to yield measurements of reasonable accuracy. In addition, other species, like CO2, H2O, NOx, CO, etc. and the temperature T, may be measured.

(2) A measurement inside the first combustor 14, 15 (with species concentration sensors 23) can be more critical since the choice of reference air as well as temperature and pressure is critical. All parameters have an impact on the signal. However, since the goal is to identify spots, where the stoichiometry switches from lean to rich, a very strong change in signal can be expected locally. Therefore even a more problematic and less accurately calibrated signal will exhibit a jump near stoichiometry, which very comfortably enables altering the fuel flow or taking other measures to influence the Lambda profile locally. In principle, this method can also be used to extract local $T_{flame}$ measures as disclosed in the aforementioned document EP 2 107 305.

Figure 2:
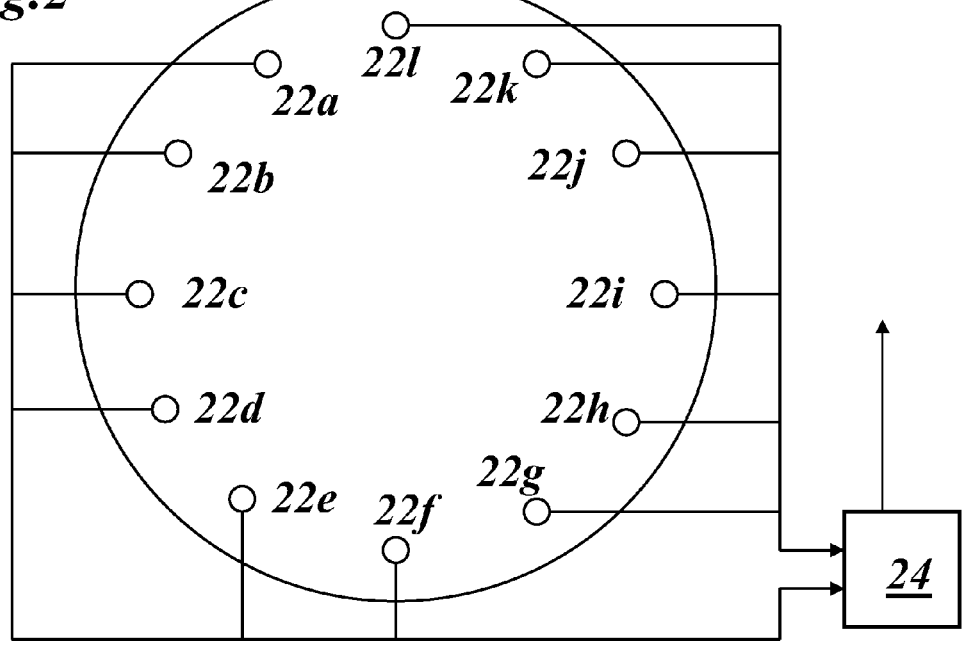
FIG. 2 in an axial view, a preferred circumferential distribution of other species concentration sensors of the invention is illustrated.

The species concentration sensors 22 or 23, which are of the ZrO2-type used as Lambda sensors for the ICEs (Internal Combustion Engine) of cars, are provided just after the first turbine (sensors 22) or within the first combustion chamber 14 (sensors 23) in a circumferential distribution, as is shown in FIG. 2 for the plurality of sensors 22a-1. They are connected to a control unit 24, which controls fuel supply valves 25 at the fuel supply of the second burners 16 (see FIG. 1).

In this way, the control of the gas turbine control and/or the combustion performance can be optimized.

With additional sensors the gas turbine is enabled to approach the limits of operation.

For the combustor, the use of ZrO2 sensors helps locally to avoid lifetime reduction due to reducing atmospheres and to homogenize flames.

LIST OF REFERENCE NUMERALS 10 gas turbine (with sequential combustion)
11 rotor
12 inner casing
13 compressor
14,18 combustion chamber
15,19 burner
16,20 fuel input
17,21 turbine
22,23 species concentration sensor (e.g. ZrO2 sensor)
22a-1 species concentration sensor
24 control unit
25 fuel supply valve
26 axis
27 recirculating device While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a gas turbine, in which turbine a $CO_2$-containing gas is compressed in a compressor, the compressed gas being used to burn a fuel in a first combustor having first burners to form hot combustion gas that is fed to a first turbine to drive the first turbine, the gas turbine also comprising a second combustor having second burners downstream of the first turbine that forms hot combustion gas that is fed to a second turbine to drive the second turbine, the method comprising:

measuring species concentrations of a gas mixture flowing through the gas turbine at several points within the gas turbine with a distributed plurality of species concentration sensors, the species comprising $O_2$ and at least one other specie; and controlling the gas turbine, optimizing the combustion performance of said gas turbine, or both, based on the measured species concentration values, the controlling of the gas turbine, optimizing the combustion performance of the gas turbine, or both based on the measured species concentration values comprising:

controlling fuel supply valves that are adjustable to facilitate a flow of fuel to the second burners to control a flow of fuel to the second combustor based on a measurement of an O2 profile of the gas mixture flowing through the gas turbine that is based on measurements from the species concentration sensors located adjacent to at least one of an outlet of the first turbine and in the first combustor.

2. The method according to claim 1, wherein the measuring of the species concentrations comprises:
measuring $O_2$ concentration, $CO_2$ concentration, CO concentration, $NO_x$ concentration, and $H_2O$ concentration of the gas mixture with said plurality of species concentration sensors.

3. The method according to claim 1, wherein said species concentration sensors comprise $ZrO_2$ sensors.

4. The method according to claim 1, wherein said species concentration sensors consist of $ZrO_2$ sensors.

5. The method according to claim 1, wherein the gas turbine is a sequential-combustion turbine in which at least part of flue gas at an exit of the gas turbine is recirculated and enters the compressor after being mixed with fresh gas.

6. The method of claim 1, wherein
the at least one other specie of the species comprises at least one of $CO_2$, CO, NOx, and $H_2O$.

7. The method according to claim 5, wherein the first turbine includes a temperature probe at an outlet of the first turbine, and wherein:
measuring the species concentrations comprises measuring an $O_2$ profile downstream of and in proximity to the temperature probe, to identify rich and lean zones in a first combustor.

8. The method according to claim 7, wherein measuring the species concentrations comprises measuring $O_2$ concentration at atmospheric pressure with fresh air as a reference.

9. The method according to claim 5, wherein measuring the species concentrations comprises measuring inside a-first combustor.

10. The method according to claim 9, further comprising:
determining local values of a flame temperature based on said measuring at least the species concentrations of $O_2$.

11. A gas turbine comprising:
a compressor;
a first combustor with a first combustion chamber and first burners;
a first turbine downstream of said first combustor;
a second combustor with a second combustion chamber and second burners downstream of said first turbine;
a second turbine downstream of said second combustor;
an inlet upstream of the compressor and a flue gas exit downstream of the second turbine;
a recirculating device configured and arranged to recirculate part of the flue gas from the flue gas exit to the inlet;
a plurality of species concentration sensors arranged within a gas flow of the gas turbine, the species concentration sensors configured to measure at least $O_2$ concentration of the gas flow and concentration of at least one other species of the gas flow; and
a control unit configured and arranged to control operation of the gas turbine, the species concentration sensors being in signal communication with the control unit; and
wherein the control unit is configured to control fuel supply valves that are adjustable to facilitate a flow of fuel to the second burners to control a flow of fuel to the second combustor based on a measurement of an $O_2$ profile of the gas flow that is based on measurements from the species concentration sensors located adjacent an outlet of the first turbine.

12. The gas turbine according to claim 11, further comprising:
a fuel supply for the second burners; and
fuel supply valves at the fuel supply of the second burners;
wherein said fuel supply valves are in communication with said control unit, and said control unit is configured and arranged to operate said fuel supply valves based on measurements of said species concentration sensors.

13. The gas turbine according to claim 12, wherein the first turbine includes an outlet, and further comprising:
a first temperature probe at an outlet of the first turbine;
wherein said species concentration sensors are arranged at distributed circumferential positions with respect to an axis of the gas turbine and downstream of and in proximity to the first temperature probe.

14. The gas turbine according to claim 12, wherein said plurality of species concentration sensors are arranged at distributed circumferential positions with respect to an axis of the gas turbine, and inside the first combustor.

15. The gas turbine according to claim 11, wherein said species concentration sensors comprise $ZrO_2$ sensors.

16. The gas turbine according to claim 11, wherein said species concentration sensors consist of $ZrO_2$ sensors.

17. The gas turbine of claim 11, wherein the species concentration sensors located adjacent an outlet of the first turbine are arranged in a circumferential distribution adjacent the outlet of the first turbine.

18. A gas turbine comprising:
a compressor;
a first combustor with a first combustion chamber and first burners;
a first turbine downstream of said first combustor;
a second combustor with a second combustion chamber and second burners downstream of said first turbine;
a second turbine downstream of said second combustor;
an inlet upstream of the compressor and a flue gas exit downstream of the second turbine;
a recirculating device configured and arranged to recirculate part of the flue gas from the flue gas exit to the inlet;
a plurality of species concentration sensors arranged within a gas flow of the gas turbine, the species concentration sensors configured to measure at least $O_2$ concentration of the gas flow and concentration of at least one other species of the gas flow; and
a control unit configured and arranged to control operation of the gas turbine, the species concentration sensors being in signal communication with the control unit; and
wherein the control unit is configured to control fuel supply valves that are adjustable to facilitate a flow of fuel to the second burners to control a flow of fuel to the second combustor based on a measurement of an $O_2$ concentration of the gas flow that is measured in the first combustor by the species concentration sensors located in the first combustor.

19. The gas turbine of claim 18, wherein the species concentration sensors located in the first combustor are arranged in a circumferential distribution in a circumferential distribution.

* * * * *